United States Patent [19]

Lee

[11] Patent Number: 5,637,055

[45] Date of Patent: Jun. 10, 1997

[54] SHIFT CONTROL SYSTEM FOR AN AUTOMATIC TRANSMISSION OF A VEHICLE

[75] Inventor: Hee-Yong Lee, Kaepo-Dong, Rep. of Korea

[73] Assignee: Hyundai Motor Company, Ltd., Seoul, Rep. of Korea

[21] Appl. No.: 416,575

[22] Filed: Apr. 4, 1995

[51] Int. Cl.[6] ............................................. F16H 59/48
[52] U.S. Cl. ........................... 477/118; 477/119; 477/144
[58] Field of Search ......................... 477/77, 78, 118, 477/119, 133, 136, 139, 141, 144, 148

[56] References Cited

U.S. PATENT DOCUMENTS

| | | | |
|---|---|---|---|
| 4,742,732 | 5/1988 | Hiramatsu | 477/119 |
| 4,829,435 | 5/1989 | Isono | 477/119 X |
| 5,016,495 | 5/1991 | Takizawa | 477/119 X |
| 5,054,336 | 10/1991 | Takizawa | 477/119 |
| 5,113,722 | 5/1992 | Iizuka | 477/119 |
| 5,161,432 | 11/1992 | Matsumoto et al. | 477/119 |
| 5,393,278 | 2/1995 | Kyushima et al. | 477/118 X |

*Primary Examiner*—Khoi Q. Ta

[57] ABSTRACT

A shift control method for an automatic transmission of a vehicle allows a kick down piston of a kick down brake in the automatic transmission to fully return after a 4-3 speed downshift operation before performing a 3-2 speed downshift operation. If it is determined that a 4-3 speed downshift signal was output by the transmission control unit, the transmission control unit is monitored to determine if a 3-2 speed downshift signal is output. A 3-2 speed downshift operation in response to a detect 3-2 speed downshift signal will then be prohibited for a predetermined period of time for the kick down piston of the kick down brake in the automatic transmission to fully return after the 4-3 speed downshift operation. Next, the 3-2 speed downshift operation will be performed in response to the 3-2 downshift signal after the predetermined period of time.

1 Claim, 2 Drawing Sheets

SHIFT CONTROL SYSTEM FOR AN AUTOMATIC TRANSMISSION OF A VEHICLE

BACKGROUND OF THE INVENTION

1. Field of the Invention

The present invention relates to a shift control system for an automatic transmission of a vehicle and more particularly, to an improved shift control system for a vehicle automatic transmission, which can prevent a shift shock of the automatic transmission.

2. Description of Related Art

Generally, a transmission increases or decreases rotating power and rotating speed of an engine according to a driving condition of a vehicle, and functions in an off-position between the engine and driving wheels for a certain period of time so as to warm-up the engine. The transmission industry classifies a manual transmission by manual operation, and an automatic transmission by automatic operation.

The automatic transmission related to the present invention is convenient to operate, enables the vehicle to start smoothly, to increase and decrease the car speed, and is less likely to stall when driven by a beginning driver. Therefore, this automatic transmission is a popular choice among drivers.

The automatic transmission comprises a "D" range which shifts in multiple stages according to a pushing degree of an accelerator pedal in driving of a vehicle, a "2" range which matches with a long downward slope of a driving road, and an "L" range which matches with an extreme downward slope and a long extreme curve.

The automatic transmission further comprises an "N" range which ignites the engine free of all elements of the engine, a "P" range which fixes an outputting shaft while the vehicle is parking, and an "R" range which operates a reverse motion of the vehicle.

The shift motion in the "D" range starts the vehicle in a 1-speed or 2-speed state without any relation of an opening degree of a throttle valve, and causes an up-shift to the 2-speed or 3-speed according to the car speed.

Also, if the throttle valve is gradually opened, a driving gear of the 1-speed, 2-speed, and 3-speed has an increasingly higher shift point thereof. If the car speed is down, the downshift automatically occurs in the 3-speed, 2-speed, and 1-speed. In this 3-speed or 2-speed state of the "D" range, if the accelerator pedal is pushed completely in order to suddenly accelerate the car speed, the automatic transmission conducts a kick down state by down-shifting in the 3-speed to 2-speed or the 2-speed to 1-speed over the shifting point thereof.

The automatic transmission is provided with a hydraulic control system for shifting by automatically operating brake bands of start gear unit and clutches according to the car speed, the engine loading degree, and the shifting lever.

Each valve of the hydraulic control system is controlled in an open loop system by a transmission control unit TCU and a fluid load of a line pressure can be controlled from the manual valves. Therefore, the star gear shifting device located at a rear portion of a torque converter conducts a shift of the upshift or the downshift.

In the "D" range of the driving function, the 1-speed to 4-speed, or recently, the 1-speed to 5-speed is accomplished in multiple stages. In detail, a rear clutch and a one-way clutch operate in the 1-speed shift, the rear clutch and a kick down brake band operate in the 2-speed shift operation, a front clutch and the rear clutch operate in the 3-speed shift operation, and an end clutch and the kick down brake band operate in the 4-speed shift operation.

Each element of the star gear device in order to accomplish the shift operation conducts one of the shift control solenoid valves operated by a control signal which is permitted from the TCU according to the driving state of the engine and the car speed, operates one of the shift control valves of valve bodies, and a pressure control solenoid valve controls the pressure which is permitted from each element of the vehicle.

However, such conventional shift control systems suffer from a number of problems, such as for example, a shift shock occurs since such conventional shift control systems do not utilize a feedback control method by the TCU due to an incomplete return operation of a kick down piston in the 3 to 2-speed downshift operation while a downshift proceeds to shift from 4-speed to 1-speed when the engine and the vehicle drive in a lower speed.

SUMMARY OF THE INVENTION

Accordingly, it is an object of the invention to provide a shift controlling method for an automatic transmission of a vehicle, which eliminates the above problems encountered with the conventional controlling methods for an automatic transmission of a vehicle.

Another object of the present invention is to provide a shift controlling method for an automatic transmission of a vehicle, which comprises a feedback controlling method by a transmission control unit so as to return fully a kick down piston of a front brake by the automatic transmission in a driving stage of the vehicle before the vehicle stops, whereby the shift operation is smoothly accomplished and can effectively prevent a shift shock.

A further object of the present invention is to provide a shift controlling method for an automatic transmission of a vehicle, which comprises the steps of a conforming stage of a downshift signal of a 4- to 3-speed for judging the existence and/or nonexistence of the downshift signal of the 4- to 3-speed when a downshift operates from the 4-speed to 1-speed in a driving state before the vehicle stops, a conforming stage of the down signal of a 3- to 2-speed for judging the existence and/or nonexistence of the down signal of the 3 to 2-speed, a holding stage of a downshift operation of the 3- to 2-speed for controlling the downshift operation of the 3- to 2-speed for a setting time so as to completely finish a return operation of a kick down piston of a kick down brake after operation of the 4- to 3-speed, and an operating stage of the downshift operation of the 3- to 2-speed after passing the setting time.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
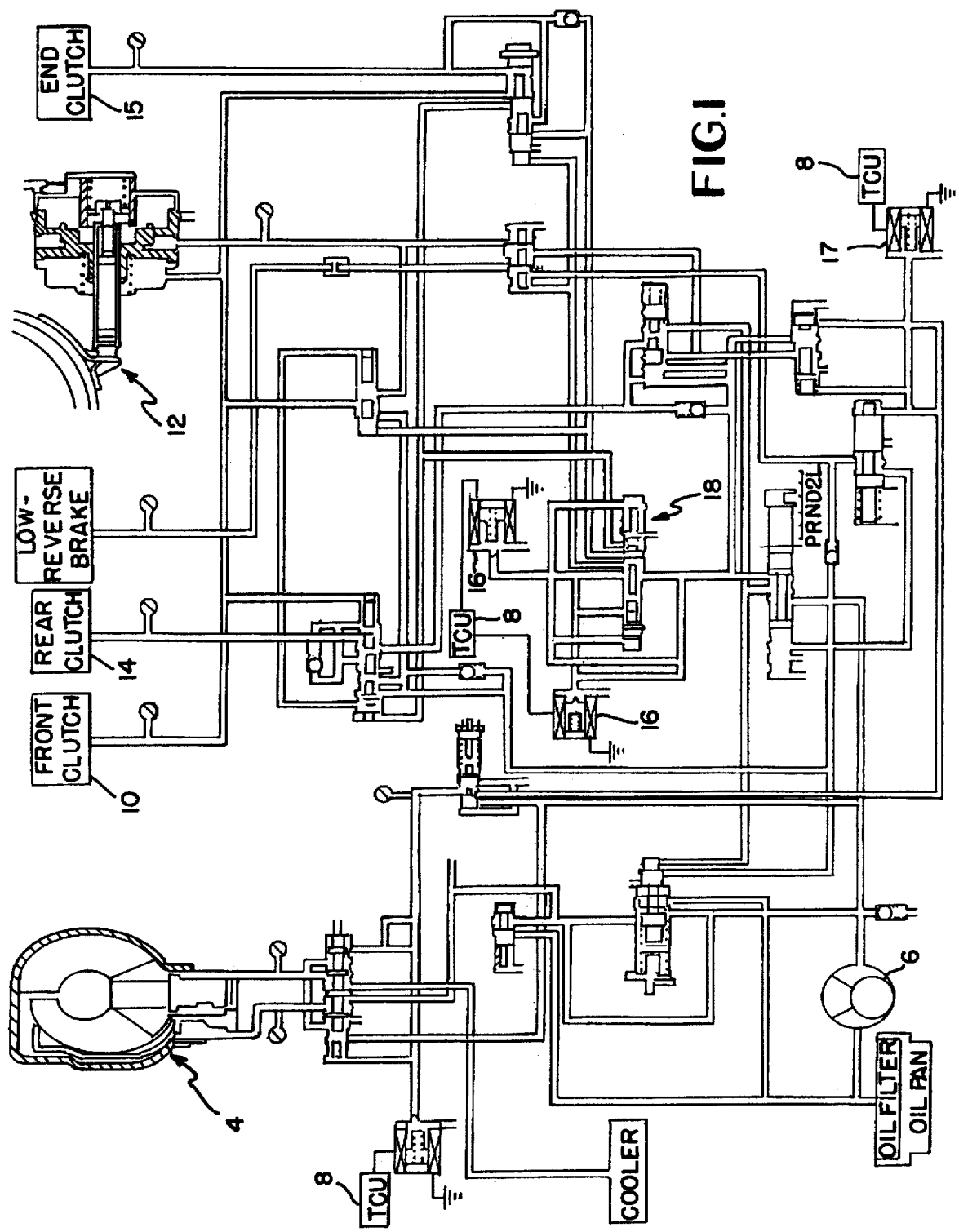
FIG. 1 is a schematic view of a shift control system for an automatic transmission of a vehicle of the present invention.
Figure 2:
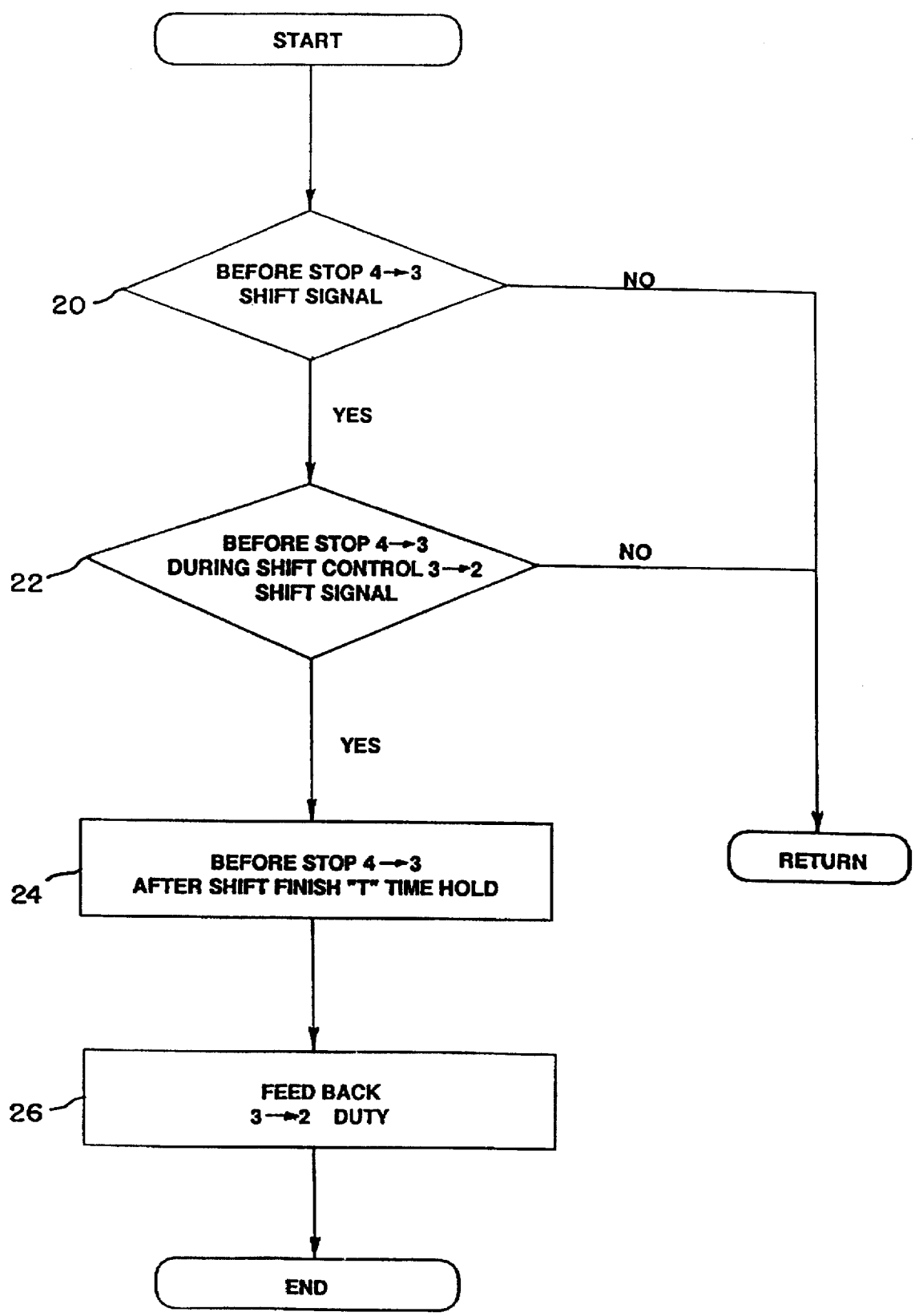
FIG. 2 is a program of the shift control method of the present invention.

Referring now in detail to the drawings for the purpose of illustrating preferred embodiments of the present invention, the shift controlling method for an automatic transmission of a vehicle as shown in FIGS. 1 and 2, comprises a hydraulic system including fluid pump 6 operated by a torque converter 4, and a plurality of valve bodies which have a plurality of valves for controlling a flowing channel of a line pressure generated by the fluid pump 6.

The hydraulic system for accomplishing the shift controlling method of the present invention enables shifting by automatically operating a star gear device according to a car speed, a load of an engine, and a position of a shift lever.

Each valve of the plurality of valve bodies is controlled by a transmission control unit (TCU) 8 and a shift control system of the star gear device conducts a shifting operation of an upshift or a downshift according to a state of the engine and the car speed.

Thus, the shift system of the star gear device conducts a selectively rotating operation according to a pressure state of the line pressure by each valve of the plurality of valves bodies.

Specifically, in the case of a "D" range which performs the driving function, multistage shifts of 1-speed to 4-speed are accomplished. That is, in a 1-speed shift operation state a rear clutch 14 from a plurality of clutches forming the star gear and a one-way clutch (not shown) operate, in a 2-speed shift operation state, the rear clutch 14 and a kick down brake band 12 operate, in a 3-speed shift operation state, a front clutch 10 and the rear clutch 14 operate, and in a 4-speed shift operation state, an end clutch 15 and the kick down brake band 12 operate.

In the "D" range, each element of the star gear device for operating the 1-speed to 4-speed enables one of the shift control solenoids 16 to be operated by a control signal which is permitted from the TCU 8 depending on the driving state of the engine and the car speed to operate a shift control valve 18, and a pressure control solenoid valve 17 controls the pressure permitted from each element and operates properly so as to match with each shift state.

As shown in FIG. 2, when the downshift operation of the 4-speed to 1-speed occurs in the driving stage before the vehicle stops, the TCU 8 provides the 4–3 speed downshift signal confirmation stage 20 for judging existence and/or nonexistence of the 4–3 speed downshift signal before the vehicle stops, and 3–2 speed downshift signal confirmation stage 22 for judging existence and/or nonexistence of the 3–2 downshift signal.

If the signal is not existing in the 4–3 speed downshift signal confirmation stage 20 and 3–2 speed downshift signal confirmation stage (22), it initially returns to the relative confirmation stages 20 and 22. If the signal is existing in 4–3 speed and 3–2 speed downshift signal confirmation stages 20 and 22, the 4–3 speed downshift operation is conducted by a hydraulic control system.

Also, the TCU 8 further provides a 3–2 speed downshift operation holding stage 24 for controlling the 3–2 speed downshift operation for a setting time "T" so as to fully accomplish a returning operation of a kick down piston of the kick down brake after the 4–3 speed downshift operates, and a downshift operation stage 26 of the 3–2 speed for actuating after passing the "T" time.

Accordingly, the shift control system for an automatic transmission of a vehicle according to the present invention provides a hydraulic pressure to the 3–2 speed downshift, and enables the TCU 8 to actuate a feedback control, so that the shift shock can be effectively prevented by being performed smoothly and softly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control method for an automatic transmission of a vehicle, comprising:

first judging whether a 4–3 speed downshift signal has been output from a transmission control unit controlling said automatic transmission;

second judging whether said transmission control unit outputs a 3–2 speed downshift signal if said first judging step indicates that said 4–3 speed downshift signal was output; and prohibiting a 3–2 speed downshift operation in response to said 3–2 speed downshift signal for a predetermined period of time for a kick down piston of a kick down brake in said automatic transmission to fully return after a 4–3 speed downshift operation in response to said 4–3 speed downshift signal when said second judging step indicates that said transmission control unit outputs said 3–2 speed downshift signal; and performing said 3–2 speed downshift operation in response to said 3–2 downshift signal after said predetermined period of time.

* * * * *